(No Model.)
2 Sheets—Sheet 1.
W. H. ASHTON.
MEAT CHOPPING MACHINE.
No. 488,979. Patented Jan. 3, 1893.
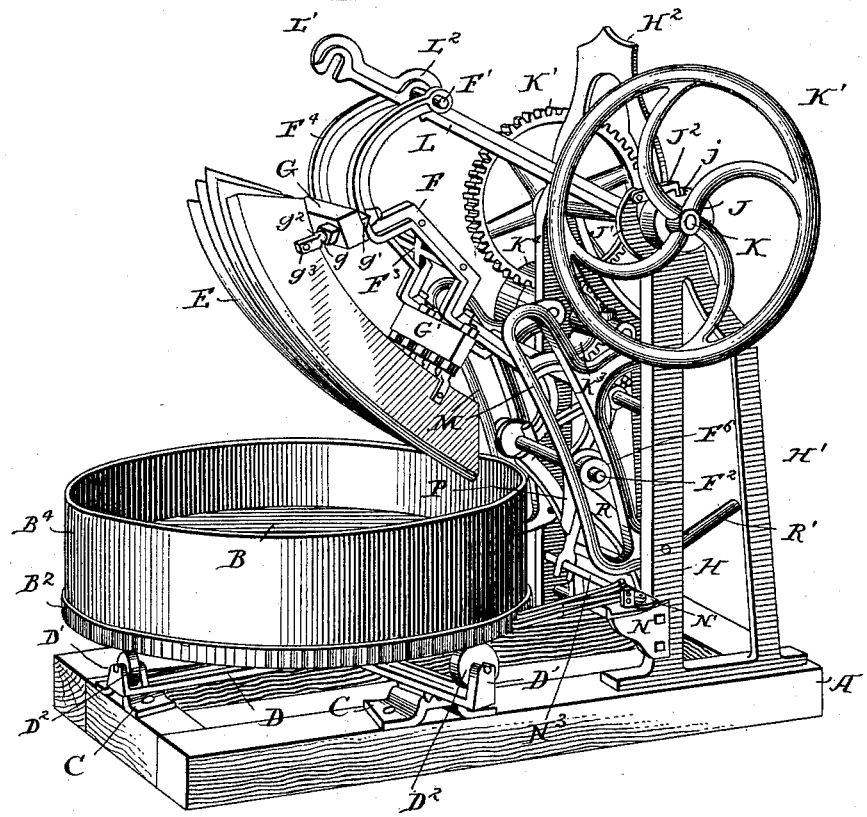
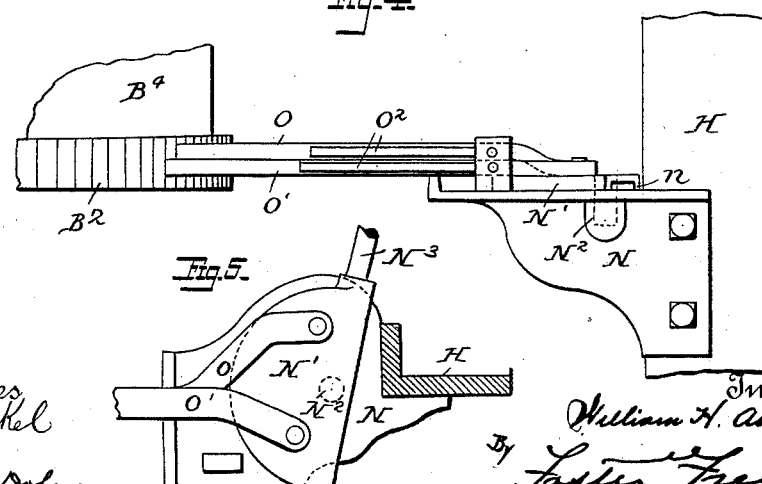
Witnesses
Jno. G. Hinkel
Alle N. Dobson
Inventor
William H. Ashton
By Foster Freeman
Attorneys (No Model.) 2 Sheets—Sheet 2.

W. H. ASHTON.
MEAT CHOPPING MACHINE.

No. 488,979. Patented Jan. 3, 1893.

Witnesses
Jno. G. Hinkel
Alec N. Dobson

Inventor
William H. Ashton
By Foster Freeman
Attorneys

UNITED STATES PATENT OFFICE.

WILLIAM H. ASHTON, OF SEWARD, NEBRASKA.

MEAT-CHOPPING MACHINE.

SPECIFICATION forming part of Letters Patent No. 488,979, dated January 3, 1893.

Application filed April 8, 1892. Serial No. 428,327. (No model.)

*To all whom it may concern:*

Be it known that I, WILLIAM H. ASHTON, a citizen of the United States, and a resident of Seward, Seward county, Nebraska, have invented certain new and useful Improvements in Meat-Chopping Machines, of which the following is a specification.

My invention relates to meat chopping machines, and more particularly to a machine embodying the general features of construction substantially as set forth in my prior patent No. 454,699, dated June 23, 1891.

The object of my present invention is to provide a meat chopping machine employing rocking blades that shall be simple in construction and operation, that rotates the block regularly, and without interfering with the motion of the knives, that is adapted to be worked by hand or steam power, that does its work quickly, quietly and well, that permits and requires the perfect rotation of the meat block by simple and effective means, and that will permit the knives to be raised free from the block and the like for the purpose of removing the meat, and cleaning the block.

My invention consists in the various combinations and arrangement of devices, substantially such as is hereinafter more particularly set forth.

Figure 2:
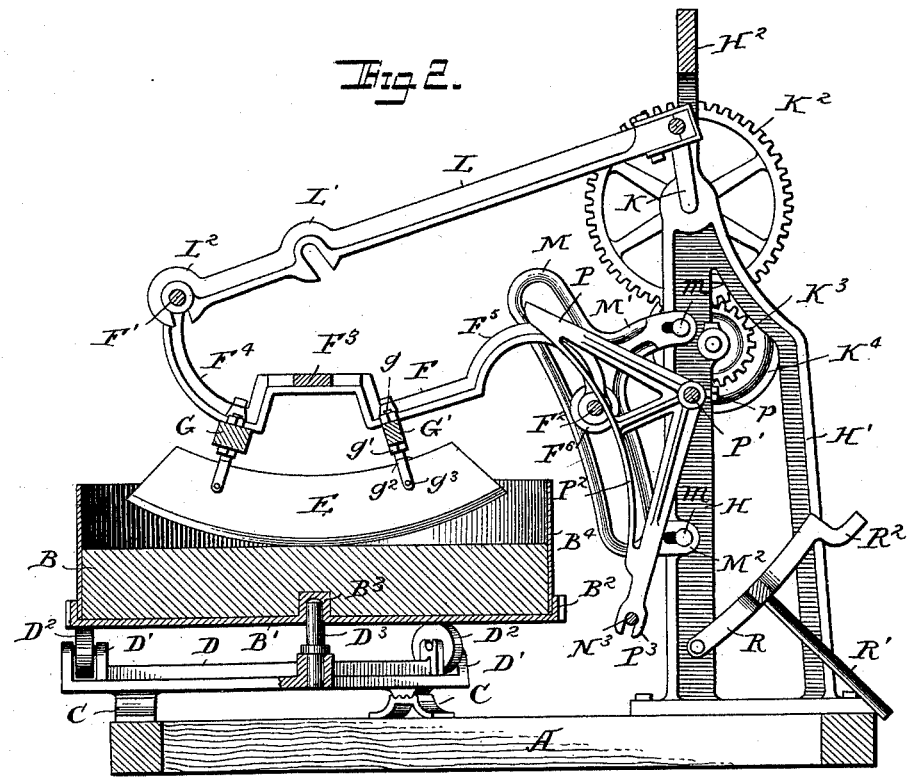
Figure 3:
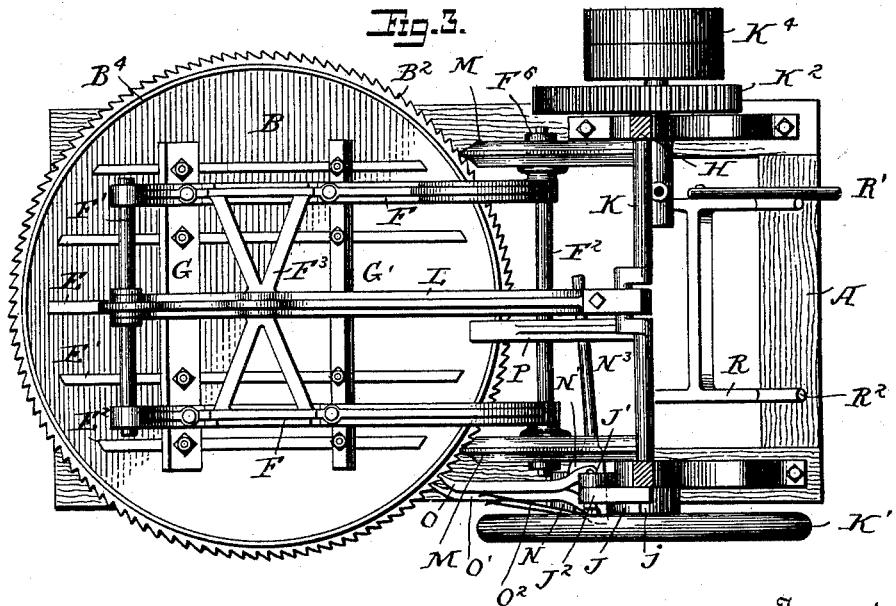

Referring to the accompanying drawings forming part of this specification, Figure 1, is a perspective view showing a machine embodying my invention; Fig. 2, is a longitudinal vertical section of the same; Fig. 3, is a plan view; and Fig. 4, is an enlarged detail. Fig. 5, is a detached, horizontal, sectional plan view, showing the rocking plate and pivot.

The production of a complete and satisfactory meat chopping device has been a well recognized want, and attempts have been made to supply this want, and in my prior patent, I showed a machine embodying some of the general principles of my present invention, and which while proving effective, was wanting in some of the requirements to produce a perfect machine, and it is with the object of improving said machine that my present invention is made, it consisting essentially in the details of construction, arrangement, and operation substantially as hereinafter pointed out, by which objections to former devices of this character have been overcome.

Referring to the drawings for a more particular description of my invention, A represents a suitable base or frame upon which the operative parts of the machine are mounted. The construction embraces a rotating block B, and in order to provide means whereby this can be easily and readily rotated, I mount upon the frame suitable bearing blocks C, which are attached to the frame by any suitable means, and form bearings for the tripod bar D. This tripod consists preferably of a metallic frame having bearings which may be notched or ribbed, as clearly shown in Fig. 2, which rest in the bearings C, and which support has formed therewith the bearings D', in which are fitted to rotate the friction rollers or wheels $D^2$, there being three in the present instance, as I have found this the most satisfactory arrangement. Mounted or resting upon these friction rollers is a circular plate or casting B', which is preferably of metal, and which forms a base or support for the blocks B, and this base is provided with an upward projecting flange $B^2$ extending around its periphery, which flange is provided with teeth to form a rack bar, as best shown in Figs. 1 and 4. In order to maintain this base properly on the tripod under all conditions, this base is provided with a central bearing $B^3$ formed in the body thereof, and fitting a central pin $D^3$ mounted in the tripod D, and serving to steady or maintain the block in its rotation around the pin on the friction wheels in the manner hereinafter set forth.

The block B is preferably made up of a series of blocks of wood having their grains running vertically of the block, although of course it may be made from a single piece of wood or other suitable material, and in order to secure it to the frame B', I provide a ring $B^4$, preferably of metal, which fits into the base B between the projecting flange $B^2$, and the blocks, and extends upward above the blocks practically forming a pan to receive the meat to be chopped.

In order to properly cut the meat, I provide a rocking cutter consisting essentially of a number of knives or blades E, E', $E^2$ &c., and these knives are made of segments of rings and are arranged in the form of a gang, suitably secured together, and connected to means whereby they may be operated to cut the meat. These blades are of unequal length, and are so arranged and attached to the knife frame, that their points or extremities will be at an equal distance from the edge of the block, as I find that this construction produces an equal wear upon the blocks, and when the knives are brought to the extreme of their limit in either direction, the points of each blade will touch the block at the same time, not only as before stated equalizing the wear upon the blocks, but more effectively and successfully cutting the meat. I have shown in the present instance five blades forming the cutter, but of course any other number of blades may be used according to the size of the machine and work to be done. These knives or blades E are mounted in a suitable framework, and I have shown this framework as consisting of the bent or curved arms F, which are held together by suitable rods F', F², and preferably provided with the brace F³. Interposed between this framework and the cutters or blades are the weights G, G', which extend across the framework, being secured to the arms thereof, and serving as supports to which the blades are attached.

In order to attach the blades securely to the weights or otherwise as may be desired, and to furnish a firm and substantial bearing therefor, I provide bolts $g$, which are shown as having the body portion threaded, and adapted to pass through the weights, and to be secured thereto by suitable nuts as $g'$, while the other end is offset at $g^2$ to form a bearing for the upper edge of the blade in direct line with the center of the bolt, while the end $g^3$ extends downward on the side of the knife, and is bolted thereto. By this construction it is obvious that the blades are securely and firmly held in position, the side extensions forming guides or supports to maintain the blade in the vertical position, while the blade bears directly upon the center of the bolt, forming a solid connection, and a direct line of pressure for the weights. By this means not only can the blades be firmly and securely held, but by the nuts on the threaded portion of the bolts, the blades can be adjusted to compensate for any wear, and to keep their edges in proper alignment, so that there will be no excessive wear upon the block.

The arms F are bent upward between the point of attachment of the weights to form a yoke which permits ready access to the nuts on the bolts for adjusting the knives, and the forward ends F⁴ are extended upward, and united by a rod F', which serves as a means of attachment for the pitman hereinafter described. The rear portion of the arms is also bent or curved as shown at F⁵, and are united by the rod F², which not only serves as a brace for the arms of the knife frame, but the ends of this rod are extended beyond the arms, and serve as bearings for the friction rollers F⁶, which operate in the guides for the knife frame hereinafter described.

Mounted upon the base A are the standards H, preferably having the braces H', and a connecting arch H². Mounted in these standards is a crank shaft K, which is provided at one end with a fly or balance wheel K', and at the other with a gear wheel K², which is arranged to mesh with a pinion K³ also mounted in the standards, and connected with the pulley K⁴, by which the crank shaft may be driven by power or otherwise. Also mounted on the crank shaft K is a slotted disk or wheel J having a slot $j$ in its periphery, and connected to and projecting from one of the standards H is an arm J', carrying a pawl J², which is arranged under circumstances hereinafter set forth to engage the slot or notch $j$ in the disk J.

Connected to the crank shaft K is the pitman L, and this is made substantially as indicated of metal having projecting ribs for the purpose of securing lightness with strength, and is provided with enlargements L', L² having open bearings for the reception of the shaft or bar F' of the knife frame. It will be noticed that the bearing L' is at the inclination to the length of the pitman, while the bearing L² is practically at right angles, and it will be seen hereinafter that this arrangement of the bearing L' is for the purpose of better holding the knife frame in its elevated position when the cutters are lifted free from the block for the purpose of removing the meat from the block, or for adjusting or cleaning the knife.

It will be seen that as the crank arm K rotates through the medium of the pitman, the knife frame will be oscillated to operate the knives, and in order to prevent the knives slipping and to insure their proper cutting action, I provide suitable guides therefor. Thus I have shown the curved guides M having an opening to receive the friction rollers F⁶, connected to the rear portion of the cutter frame, and these guides are provided with projecting arms M', M² having slotted openings, by means of which they are adjustably mounted on the standards H, being secured thereto by screws or bolts $m$. These guides are so shaped that when properly mounted and adjusted on the standards, they will control the movement of the cutting knives under the operation of the pitman, so that the meat will be cut to the best advantage.

It has been found advantageous in this class of machines to intermittently rotate the cutting block, and in order to produce the best results it is desirable to provide means which shall operate simply and effectively to produce a given amount of motion to the block at each reciprocation of the knife frame, and also to provide means whereby the amount of motion given may be adjusted according to the nature of the material being operated upon. In order to accomplish this, I mount upon a plate or support N, which is attached to one of the standards H, a rocking plate N', which is connected to the plate N by a pivot N², and is provided with an arm N³, by which it may be operated. In order to allow free movement of this rocking plate, and to prevent undue friction, it is provided with a lip or projecting edge n, around its periphery, as best seen in Fig. 4. Mounted on this rocking plate are the pawls O, O', which are arranged to engage the ratchet B² on the base of a block, and to insure this engagement, I provide springs O², which are mounted on the support N, and bear on the pawls. These pawls are mounted on the rocking arm N' of the pivot pin N², so that as the plate N is vibrated in one direction, one of the pawls will engage with the ratchet teeth and move the block a certain degree, and when the plate is rocked in the other direction, the other pawl will engage the ratchet teeth, and move the block still farther, they operating alternately on the block, and move it at each half reciprocation of the knives by mechanism hereinafter described, so that each cutting action of the knives will fall upon a different portion of the block, and consequently of the material supported thereon, and at the same time the block will be rotated with a uniform step by step motion.

As before stated the rocking plate N' is provided with an arm N³ by means of which the plate can be vibrated, and in order to do this, I provide a lever P, which is shown as mounted upon a shaft P' supported in the standards H, and as having a curved surface P², while the lower arm of the lever is bifurcated as at P³ to embrace the arm N³. This lever is adjustably mounted on the shaft P', and is secured by a set screw p, and in this way it will readily be seen that by moving it laterally of the machine on the shaft, the bifurcated portion will engage the arm N³ at different distances from the pivot pin N² of the pivot plate, and in this way the extent of the rocking movement of said plate may be adjusted and consequently the block will be rotated more or less at each step. This lever is so arranged that it is engaged by the bar or shaft F² of the knife frame, and is oscillated when the knives are near the ends of their stroke in either direction, when they are practically resting on their points, as in this way I find that the block can be moved to present a new portion of the material to the cutting knives with the least danger of injuring or wearing the block.

It is desirable to provide means whereby the knives can be raised free from the blocks for the purpose of removing the meat or otherwise, and in order to do this, I provide a frame or support R, which is shown as pivoted to the standards, and having a brace piece R', upon which it normally rests when not in use. The upper portion of this frame is bent to form seats R², and when it is desired to raise the knives, the support R is rocked forward, and the bar or rod F² rests in the seats R² as shown best in Fig. 1, while the rod or shaft F' is engaged by the notch L' of the pitman. The crank shaft is then rotated so as to bring the parts to the position shown in Fig. 1, when the pawl J² engages the notch j in the wheel J on the crank shaft, and the parts are securely locked in this position, the knives being supported entirely free from the cutting block.

The operation of the machine as thus described will be readily understood from what has been stated above, and while it may be operated by power through a belt or other means transmitting motion to the pulley K⁴, it is evident that the knives can be rocked by hand, and I have found by this construction that the parts are so arranged as to require comparatively little power to operate the device, and to effectively cut the meat, the arrangement being such that there is comparatively little friction, and all the parts operate in unison to produce the best results, and the whole constitutes a machine which I have found well adapted to the purposes for which it is intended.

What I claim as my invention is:

1. In a meat chopping machine the combination with the main frame, of the bearing pieces secured thereto, the tripod resting in the bearing pieces and provided with friction pulleys, the base piece supporting the block mounted on said pulleys, and provided with a central bearing piece, substantially as described.

2. In a meat chopping machine, the main block comprising a base piece supporting the block, the base piece having a flange provided with external ratchet teeth, and having a central pivot formed therein, and a metallic ring fitted between the blocks and the flange, and projecting above the blocks, substantially as described.

3. In a meat chopping machine a cutter comprising a series of segmental knives, a frame composed of the curved bars and weights connected to the frame and interposed between the bars and the cutters, substantially as described.

4. In a meat chopping machine, a cutter comprising a series of segmental knives, a frame, weights attached to the frame, and bolts connected to the knives and attached to the weights, substantially as described.

5. In a meat chopping machine, a cutter comprising a series of knives, bolts having offsets connected to the side of the knives with the edges of the knives bearing on the offsets, the bolts being screw threaded and adapted to be adjusted in the support for the knives, substantially as described.

6. In a meat chopping machine, a cutter comprising a frame, weights secured to the frame, a series of knives, and bolts having offsets secured to the sides of the knives, the edges of the knives being in line with the body of the bolt, and the bolts being screw threaded and adapted to be adjusted in the weights, substantially as described.

7. In a meat chopping machine the combination with the rotating block, of the cutter having segmental knives, the frame of the cutter being provided with a curved extension projecting toward the front ends of the cutters, and a pitman connected to the said extension, substantially as described.

8. In a meat chopping machine the combination with the rotating block having a peripheral ratchet, of the plate supported on suitable standards, a pivoted rocking plate mounted thereon, the rocking plate being provided with a circumferential rib bearing on the supporting plate, substantially as described.

9. In a meat chopping machine the combination with the rotating block having an external ratchet, of a plate supported on suitable standards, a pivoted rocking plate mounted on said supporting plate, the pivoted plate having a peripheral flange, pawls mounted on either side of the pivot, springs for engaging said pawls, and an arm connected to the pivot plate whereby the pawls may be operated, substantially as described.

10. In a meat chopping machine the combination with the rotating block, a pivoted plate carrying pawls for rotating the block and having an extended arm, of the adjustable lever mounted in standards, and connected to the arm of the rocking plate, substantially as described.

11. In a meat chopping machine the combination with the rotating block, an oscillating cutter, the frame of which is provided with a shaft $F^2$, a pivoted plate carrying pawls for rotating the block, and having a projecting arm, a pivoted adjustable lever mounted in standards and connected to said extended arm, and arranged to be operated by the shaft $F^2$, the construction of the lever being such that it will be vibrated as the rocking cutter reaches the extremity of its movements in either direction, substantially as described.

12. In a meat chopping machine the combination with the block and means for intermittently rotating it, an oscillating cutter mounted on the block, and means for oscillating the same, the connections between the oscillating cutter and means for rotating the block, the arrangement being such that the block will be rotated when the cutter is resting with the end of the central plate of the cutter bearing on the block, substantially as described.

In testimony whereof I have signed my name to this specification in the presence of two subscribing witnesses.

WILLIAM H. ASHTON.

Witnesses:
GEO. A. MERRIAM,
JOHN S. KITTLE.